US012804182B2

(12) United States Patent
Filippov et al.

(10) Patent No.: US 12,804,182 B2
(45) Date of Patent: Nov. 17, 2026

(54) METHOD FOR TRANSFORMING DATA AND RELATED DEVICE

(71) Applicant: HUAWEI TECHNOLOGIES CO., LTD., Shenzhen (CN)

(72) Inventors: Alexander Nikolaevich Filippov, Moscow (RU); Kirill Igorevich Solodskikh, Moscow (RU); Vladimir Maximovich Chikin, Moscow (RU); Dehua Song, Beijing (CN); Stanislav Yuryevich Kamenev, Dongguan (CN); Irina Zhelavskaya, Moscow (RU)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/950,354

(22) Filed: Nov. 18, 2024

(65) Prior Publication Data

US 2025/0080768 A1 Mar. 6, 2025

Related U.S. Application Data

(63) Continuation of application No. PCT/RU2022/000165, filed on May 19, 2022.

(51) Int. Cl.

| | |
|---|---|
| ***H04N 19/48*** | (2014.01) |
| ***H04N 9/69*** | (2023.01) |
| ***H04N 19/124*** | (2014.01) |

(52) U.S. Cl.

CPC ............... *H04N 19/48* (2014.11); *H04N 9/69* (2013.01); *H04N 19/124* (2014.11)

(58) Field of Classification Search

CPC ........ H04N 19/48; H04N 9/69; H04N 19/124; H04N 19/42; G06N 3/0495; G06N 3/08

See application file for complete search history.

(56) References Cited

U.S. PATENT DOCUMENTS

| | | | | |
|---|---|---|---|---|
| 2011/0206254 | A1* | 8/2011 | Patwardhan | A61B 5/0077 382/128 |
| 2018/0115774 | A1* | 4/2018 | Su | H04N 19/186 |
| 2020/0098304 | A1* | 3/2020 | Hou | G06V 10/56 |
| 2022/0004798 | A1* | 1/2022 | Zhu | G06T 5/70 |

(Continued)

FOREIGN PATENT DOCUMENTS

| | | | | |
|---|---|---|---|---|
| JP | 2019201255 | A | 11/2019 | |
| WO | WO-2004017286 | A2 * | 2/2004 | H04N 5/202 |
| WO | 2022006556 | A1 | 1/2022 | |

OTHER PUBLICATIONS

International Search Report and Written Opinion, dated Jan. 13, 2023 in International Application No. PCT/RU2022/000165, 12 pages.

*Primary Examiner* — Shahan Ur Rahaman

(57) ABSTRACT

Embodiments of this application provide a method method for transforming data and a related device. The method includes: obtaining an input image, wherein the input image includes N pixels, N is a positive integer; performing a nonlinear transformation on values of the N pixels to obtain N first pixel values; obtaining, according to a quantized model and the N first pixel values, M second pixel values, wherein M is a positive integer; performing a reverse transformation corresponding to the nonlinear transformation on the M second pixel values to obtain M third pixel values; determining, according to the M third pixels values, an output image.

17 Claims, 5 Drawing Sheets

(56) References Cited

U.S. PATENT DOCUMENTS

| | | | | |
|---|---|---|---|---|
| 2022/0138992 | A1 * | 5/2022 | Wu | G06N 3/088<br>382/232 |
| 2022/0239944 | A1 * | 7/2022 | Zhang | H04N 19/172 |

* cited by examiner

METHOD FOR TRANSFORMING DATA AND RELATED DEVICE

CROSS-REFERENCE TO RELATED APPLICATIONS

This application is a continuation of International Application No. PCT/RU2022/000165, filed on May 19, 2022, the disclosure of which is hereby incorporated by reference in its entirety.

TECHNICAL FIELD

Embodiments of the present invention relate to the field of artificial intelligence technologies, and more specifically, to a method for transforming data and a related device.

BACKGROUND

In computer science, there are two main numerical types: integers and floating points. The floating points are often used in machine learning models. For example, input data of the machine learning models and parameters of the machine learning models, e.g., weights of the machine learning model and input data of inner model layers, are floating point values. However, integer arithmetic works faster on hardware than floating point arithmetic. Therefore, a quantization technique is proposed to accelerate inference as well as to reduce memory and power consumption on hardware.

The aim of the quantization is to transform floating point values into integer values. For example, input data of the machine learning models may be transform from floating point values into integer values, and the machine learning models may execute operations with integer values rather than floating point values. However, input data in various tasks have their own specifics, which makes quantization difficult.

SUMMARY

Embodiments of this application provide method for transforming data and a related device. The technical solution may improve the quality of data quantization.

According to a first aspect, an embodiment of this application provides a method for transforming data, wherein the method includes: obtaining an input image, wherein the input image includes N pixels, Nis a positive integer; performing a nonlinear transformation on values of the N pixels to obtain N first pixel values; obtaining, according to a quantized model and the N first pixel values, M second pixel values, wherein M is a positive integer; performing a reverse transformation corresponding to the nonlinear transformation on the M second pixel values to obtain M third pixel values; determining, according to the M third pixels values, an output image.

The proposed data transformation method does not depend on the machine learning model and quantization format and does not require model changes. The proposed data transformation method allows for effective implementations. The proposed data transformation of inputs and outputs will practically not change the inference time of the quantized model. Further, the proposed data transformations allow for efficient implementation. Thus, the proposed technique makes it possible to increase the quality of quantized models in which the data is unevenly distributed, and at the same time the inference time of quantized models practically does not change.

In a possible design, wherein the performing a nonlinear transformation on values of the N pixels to obtain N first pixel values, includes: performing a polynomial transformation on the values of the N pixels to obtain the N first pixel values.

The polynomial transformation is an efficient nonlinear transformation method. According to the polynomial transformation, an electronic device may perform the nonlinear transformation more efficiently. Furthermore, the polynomial transformation may be performed by using Horner's method. The electronic device may perform the polynomial transformation using fused multiply-add (FMA) operations, making the nonlinear transformation more efficient and faster.

In a possible design, wherein a bounded degree of the polynomial transformation is less than 5.

The bounded degree is less than 5 may achieve a good balance between the calculation time of the polynomial transformation and the quality of the result.

In a possible design, wherein the performing a nonlinear transformation on values of the N pixels to obtain N first pixel values, includes: performing a gamma correction on the values of the N pixels to obtain the N first pixel values.

In a possible design, wherein a part or all of parameters of the nonlinear transformation are obtained by training, and wherein data used to train the parameters are used to train the quantized model.

According to this design, the nonlinear transformation and the reverse nonlinear transformation may be trained together with the quantized model. Therefore, the nonlinear transformation and the reverse nonlinear transformation may be more suitable for the quantized model, and may achieve a high quality result.

In a possible design, wherein the performing a nonlinear transformation on values of the N pixels to obtain N first pixel values, includes: performing the nonlinear transformation, by looking up a first transformation table, on the values of the N pixels to obtain the N first pixel values.

Although storing the first transformation table will consume the storage of the electronic device, it is the fastest nonlinear transformation compared with the polynomial transformation and the gamma-degamma correction. In a possible design, one of the nonlinear transformation or the revers nonlinear transformation may be given by a lookup table and the other one may be given by the polynomial transformation/the gamma-degamma correction. For example, the forward transformation may be given by a lookup table, while the reverse transformation may be given by a polynomial. Any combination options are possible.

In a possible design, wherein bitwidth of the quantized model is less than bitwidth of the input image.

This technique can significantly increase the quality of quantized models in the tasks of quantization of models whose bitwidth is less than the bitwidth of the input data, for example, in the tasks of 8-bit full-int quantization of models that process 12-bit raw data.

According to a second aspect, an embodiment of this application provides an electronic device, and the electronic device has function of implementing the method in the first aspect. The function may be implemented by hardware, or may be implemented by hardware executing corresponding software. The hardware of the software includes one or more modules corresponding to the function.

According to a third aspect, an embodiment of this application provides a computer readable storage medium, including instructions. When the instructions runs on a computer, the computer is enabled to perform the method in the first aspect or any possible implementation of the first aspect.

According to a fourth aspect, an electronic device is provided, including a processor, a memory, and a communications interface. The processor is connected to the memory and the communications interface. The memory is configured to store instructions, the processor is configured to execute the instructions, and the communications interface is configured to communicate with another network element under control of the processor. When the processor executes the instructions stored in the memory, the processor is enabled to perform the method in the first aspect or any possible implementation of the first aspect.

According to a fifth aspect, a chip system is provided, where the chip systems includes a memory and a processor, wherein the memory is configured to store a computer program, and the processor is configured to invoke the computer program from the memory and run the computer program, so that a server on which the chip is disposed performs the method in the first aspect or any possible implementation of the first aspect.

According to a sixth aspect, a computer program product is provided, wherein when the computer program product runs on a server, the server is enabled to perform the method in the first aspect or any possible implementation of the first aspect.

DESCRIPTION OF EMBODIMENTS

Figure 1:
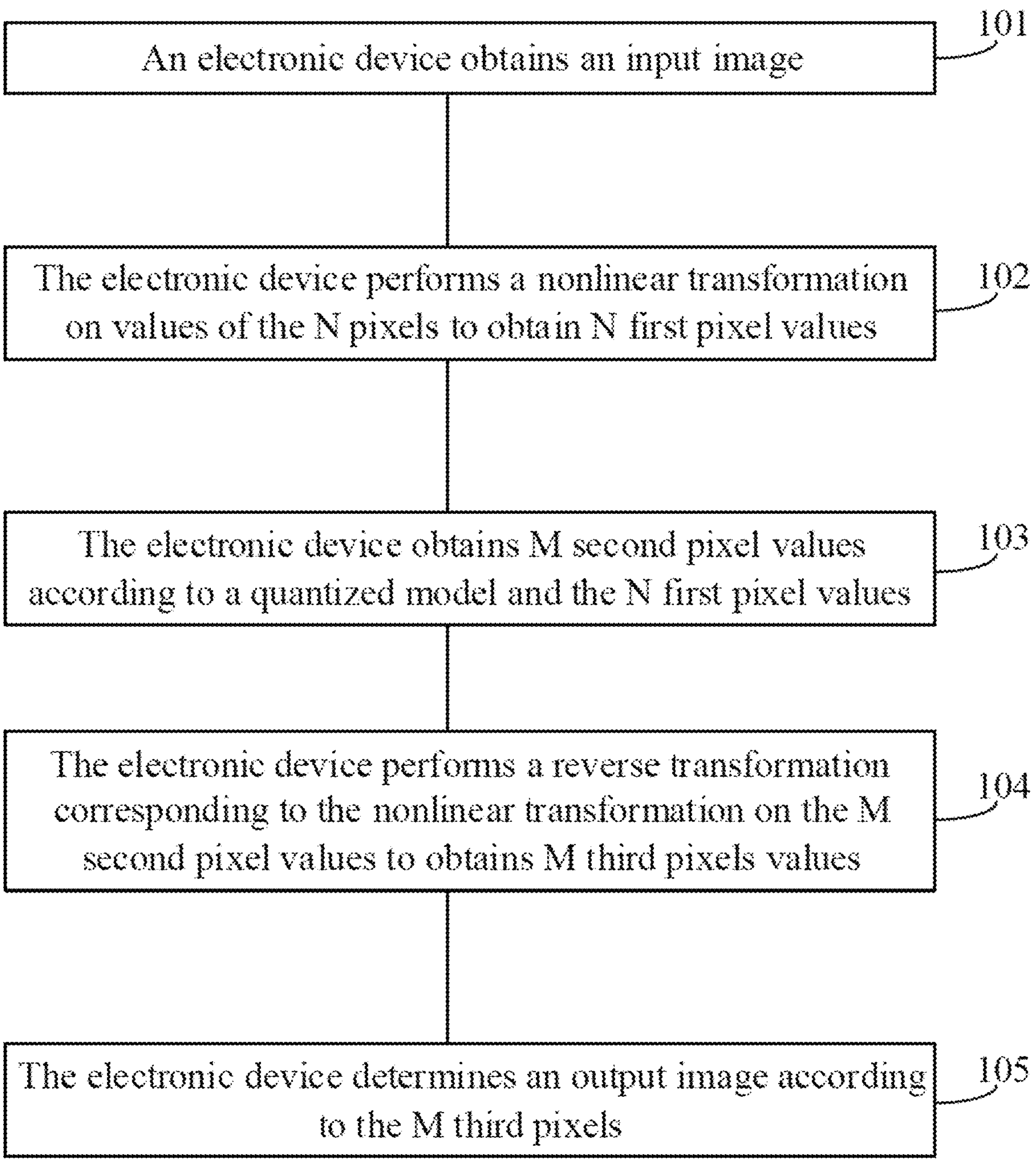
FIG. 1 is a flowchart of an embodiment of the method for transforming data.

The following describes the technical solutions in this application with reference to the accompanying drawings.

In artificial intelligence (AI) models, using integer arithmetic may give significant speed up. But in general it is not easy to obtain integer values by scaling. Hardware is restricted by number of bits (that is bitwidth of the hardware). For example, an 8-bit signed integer may store $2^8$ (or 256) integer values. If the bitwidth of the hardware is 8-bit, the hardware may support integer values from −128 to 127. If two floating point values (0.1 and 0.0001) are transformed into two integer values by scaling, a scale parameter for transforming the two floating point values is 10000, and the result of the transformation is 1000 and 1. However, 1000 is more than 128, and the hardware cannot support this integer value. Therefore, the scale parameter 10000 cannot be used to transform the floating point values by the hardware.

The procedure of searching scale parameters and tuning parameters of the AI models to obtain integers is called quantization. The AI models mentioned in the present application may include machine learning models, deep learning models, neural network models, deep neural network (DNN) models, or the like. Quantization is a powerful method for acceleration and compression of the AI models. Full-int quantization of AI models implies the use of exclusively integer arithmetic in computing the AI models, and therefore requires quantization of the first and last model layers, as well as the model input. For current hardware, using different arithmetic for different network parts entails significant overhead during model calculation, and therefore full-int quantized models are much more efficient than quantized models, for calculating some parts of which a large bit rate is used, for example, 16 or 32 bit (even if only for the first or last layer). However, the need to quantize absolutely all layers often leads to a deterioration in the quality of quantization. Thus, due to efficiency, full-int quantization has high business value, but high quality drawdowns of such quantized models significantly complicate the use of full-int quantization.

The distribution of input data of the AI models is often uneven, especially in some computer vision tasks. In some deep learning tasks, the distribution of input data and at the same time the distribution of inputs to the inner layers is non-uniform, and most of the data values can be concentrated in certain areas. This fact is often a serious obstacle to existing methods of traditional uniform quantization of the AI models in the case of quantization, when the bitwidth of the quantized model is less than the bitwidth of the original input data. Data in various tasks have their own specifics, and may have a special distribution that makes quantization difficult. For example, raw data in denoising tasks use 12 bits for representation, and their distributions are often concentrated around zero, which significantly degrades the quality of traditional 8-bit quantization of models in such tasks. Also, for example, the color distribution of night urban photos has a peak around zero and a very long tail. Due to the large quantization error of the input data, as well as the inputs of the inner model layers, the quality of the final quantized model can significantly decrease. A special type of quantization is full-integer quantization—it has a high business value, since it allows the most effective implementations of quantized networks, but suffers the most from the described problem.

The present application provides a novel technique for network quantization, which allows to reduce the impact of the described issue. More specifically, the present application proposes a new data transformation method for the quantized models to make the distribution of inputs of first and other model layers closer to uniform distribution. This allows to reduce the data quantization error, and in the result the inputs of model layers will be much easier to quantize.

FIG. 1 is a flowchart of an embodiment of a method for transforming data.

101, An electronic device obtains an input image. The input image includes N pixels, wherein N is a positive integer.

In some cases, the electronic device may be a computer. For example, the electronic device may be a personal computer, a laptop, a mobile phone, a tablet computer, a virtual reality device, and so on.

In some other cases, the electronic device may be a component in the computer. For example, the electronic device may be a central processing unit (CPU), a graphics processing unit (GPU), a neural processing unit (NPU), a system on chip (SoC), and so on.

The input image may be a picture, a part of a picture, a frame of a video, a part of a frame, and so on.

102, The electronic device performs a nonlinear transformation on values of the N pixels to obtain N first pixel values.

The N first pixel values are in one-to-one correspondence with the N pixels. In another word, the electronic device performs the nonlinear transformation on the value of the $n^{th}$ pixel among the N pixels to obtain the $n^{th}$ first pixel value among the N first pixel values, n=1, . . . , N.

103, The electronic device obtains M second pixel values according to a quantized model and the N first pixel values. M is a positive integer.

The only restriction on the model mentioned in step 103 is that the model is the quantized model. The quantized model may be a full-int quantized model or any other type of quantized model. The present application does not limit functionality of the quantized model or a computer vision task performed by using the quantized model. In another word, the quantized model may be any model used for the computer vision task. For example, the quantized model may a model for image enhancement, a model for image compression, a model for image segmentation, or the like.

The value of M may be determined according to the task of the quantized model. For example, if the quantized model is used for denoising the input image, M may be equal to N; if the quantized model is used for increasing resolution of the input image, M may be greater than N; if the quantized model is used for extracting a specific element (e.g., a person, a license plate, and the like) in the input image, M may be less than N.

104, The electronic device performs a reverse transformation corresponding to the nonlinear transformation on the M second pixel values to obtains M third pixels values.

105, The electronic device determines an output image according to the M third pixels.

For example, if the quantized model is used for increasing the resolution of the input image, the output image may be a clearer image; if the quantized model is used for extracting a specific element, the output image may be an image of the extracted specific element.

Figure 2:
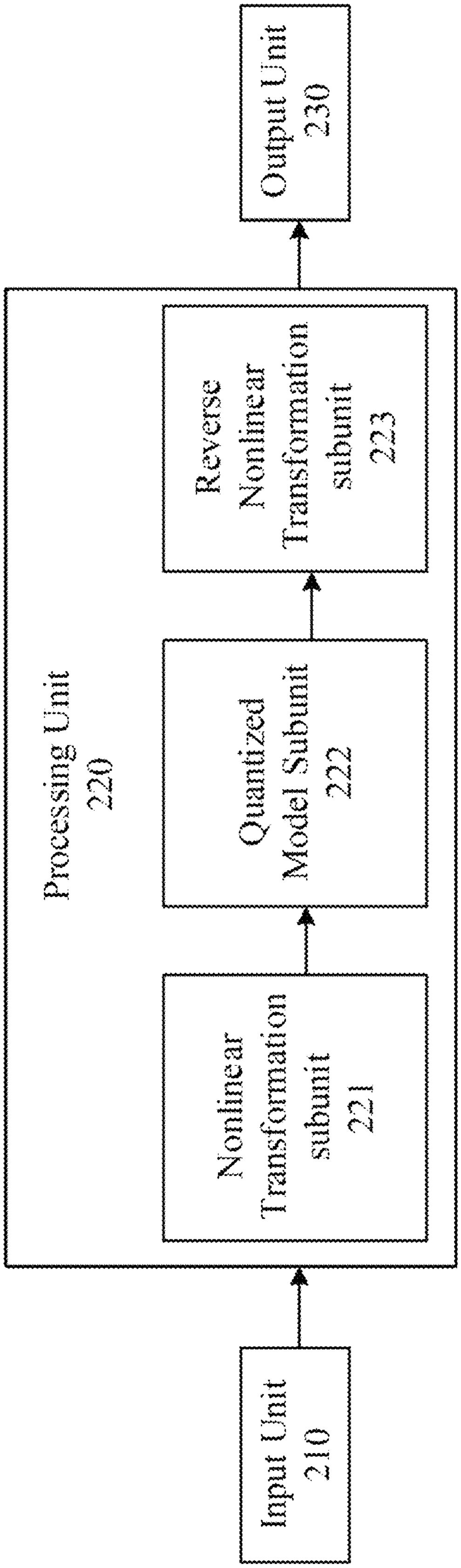
FIG. 2 shows a pipeline corresponding to the method for transforming data.

The method shown in FIG. 1 may be regarded as a pipeline. FIG. 2 shows the pipeline corresponding to the method shown in FIG. 1.

As shown in FIG. 2, a pipeline 200 includes three units: an input unit 210, a processing unit 220, and an output unit 230.

The input unit 210 is configured to obtain the input image.

The processing unit 220 includes three subunits: a nonlinear transformation subunit 221, a quantized model subunit 222, and a reverse nonlinear transformation subunit 223.

The nonlinear transformation subunit 221 is configured to perform the nonlinear transformation on values of the N pixels of the input image to obtain N first pixel values.

The nonlinear transformation subunit 221 is used to perform the nonlinear transformation on each value of the N pixels to obtain the N first pixel values. The nonlinear transformation does not change the numerical type of inputs of the nonlinear transformation subunit 221. In another word, if inputs of the nonlinear transformation subunit 221 are floating point numbers, outputs of the nonlinear transformation subunit 221 will be the floating point numbers as well. Therefore, the numerical type of the N first pixel values and the N pixels' values is the floating point.

The quantized model subunit 222 is configured to process the N first pixel values to obtain M second pixel values.

The quantized model subunit 222 may first quantize input data (that is the N first pixel values), then use the quantized model to process quantized input data, and finally dequantize output data of the quantized model to obtain output data (that is the M second pixel values). Therefore, the work of the quantized model subunit 222 may be summarized as: quantization, quantized model processing, and dequantization (reverse quantization).

As described above, the nonlinear transformation subunit 221 does not transform the floating point numbers into integer numbers. Therefore, the transformation work of the numerical type of the N first pixel values may be performed by the quantized model subunit 222. The quantized model subunit 222 may first convert the N first pixel values from the floating point numbers into the integer numbers (that is the quantization). For ease of description, the result of the quantization is referred to as N first integer values. The N first integer values are in one-to-one correspondence with the N first pixel values. Each of the N first integer values is obtained according to the corresponding first pixel value. In another word, the quantized model subunit 222 transforms the $n^{th}$ first pixel value among the N first pixel values into the $n^{th}$ first integer value among the N first integer values. The key to the present application is about how to transform the value of the input images to get the inputs of the quantized model subunit 222 (that is, how the nonlinear transformation subunit 221 works) and how to transform the outputs of the quantized model subunit 222 to get the output image (that is, how the reverse nonlinear transformation subunit 223 works). Therefore, there is no limitation on the method for quantizing/dequantizing the floating point numbers in the present application. In another word, the quantized model subunit 222 may perform the full-int quantization or any other type of quantization on the N first pixel values to obtain the N first integer values.

After the quantization, the quantized model subunit 222 may use the quantized model to process the N first integer values. As described above, there is no limitation on the function of the quantized mode in the present application. The N first integer values are inputs of the quantized model, and outputs of the quantized model are M second integer values.

After obtaining the M second integer values, the quantized model subunit 222 may transform the M second integer values into M floating point values (that is, the M second pixel values). Similarity, the M second integer values are in one-to-one correspondence with the M second pixel values. Each of the M second pixel values is obtained according to the corresponding second integer value. In another word, the quantized model subunit 222 transforms the $m^{th}$ second integer value among the M second integer values into the $m^{th}$ second pixel value among the M second pixel values, wherein m=1, . . . , M.

The reverse nonlinear transformation subunit 223 is configured to perform the reverse transformation corresponding to the nonlinear transformation on the M second pixel values to obtain M third pixel values. Similarly, the reverse transformation performed by the reverse nonlinear transformation subunit 223 does not change the numerical type of the M second pixel values.

The output unit 230 is configured to determine the output image according to the M third pixel values.

The distribution of machine learning model inputs is often uneven, especially in some computer vision tasks. In some machine learning tasks, the distribution of input data and at the same time the distribution of inputs to the inner layers is non-uniform, and most of the data values can be concentrated in certain areas. This fact is often a serious obstacle to existing methods of traditional uniform quantization of machine learning models in the case of quantization, when the bitwidth of quantized models is less than the bitwidth of the original input data. Data in various tasks have their own specifics, and may have a special distribution that makes quantization difficult. For example, raw data in denoising tasks use 12 bits for representation, and their distributions are often concentrated around zero, which significantly degrades the quality of traditional 8-bit quantization of models in such tasks. Also, for example, the color distribution of night urban photos has a peak around zero and a very long tail. Due to the large quantization error of the input data, as well as the inputs of the inner model layers, the quality of the final quantized models can significantly decrease.

The method shown in FIG. 1 or the pipeline shown in FIG. 2 provides a novel technique for transforming the input data of the quantized model, which allows to reduce the impact of the described issue. The new data transformation and de-transformation method (pipeline) for computing quantized models to make the distribution of inputs of first and other model layers closer to uniform distribution. This allows to reduce the data quantization error, and in the result the inputs of model layers will be much easier to quantize.

The technical solution of the present application uses non-linear transformations of input and output data aimed at improving the quality of data quantization. For convenience, the proposed technical solution of the present application may be called non-linear Data transformations for quantization (NDTQ), and the pipeline shown in FIG. 2 may be called a NDTQ pipeline.

Figure 3:
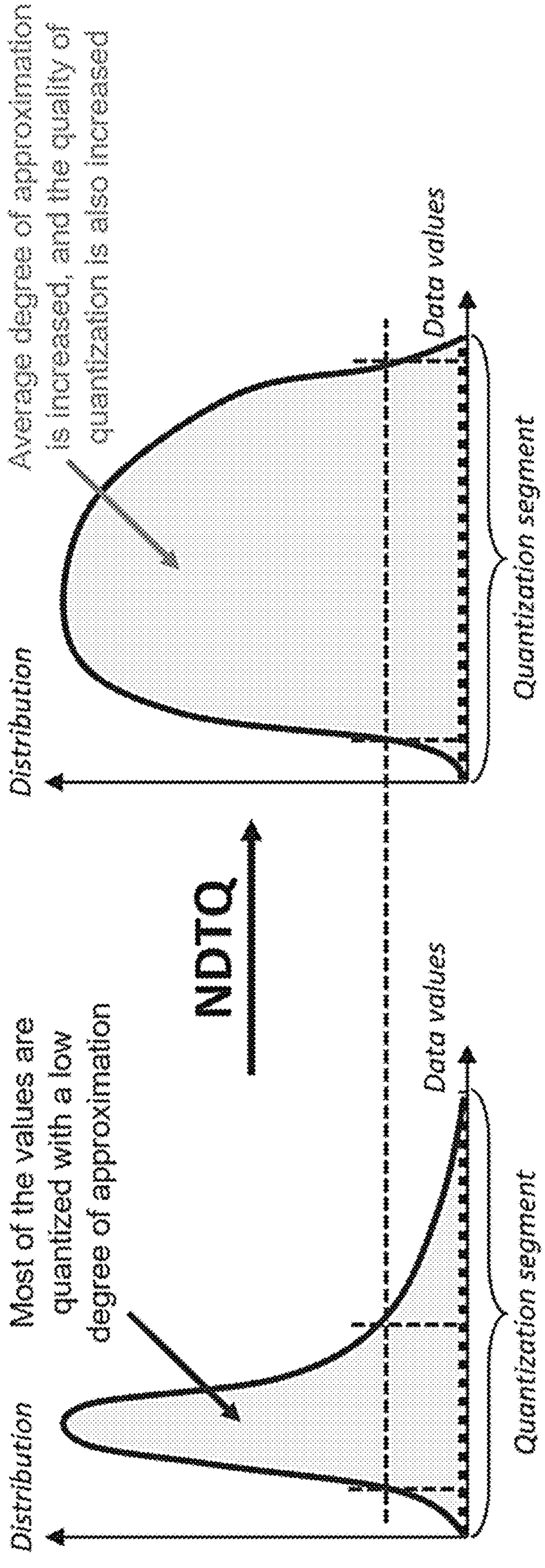
FIG. 3 shows the difference between a typical case of distribution of model input data and the result of the transformation proposed by the present application.

FIG. 3 shows the difference between a typical case of distribution of model input data and the result of the transformation proposed by the present application.

Left graph in FIG. 3 presents a distribution of original input data that takes values from 0 to 1. Most of the data are clustered around zero and only few pixels have values exceeding half of the dynamic range (greater than 0.5). Hence, if one selects a quantization range equal to [0, 1.0], then most of the values will be quantized with low degree of approximation, otherwise if one shrinks the range down to [0, 0.5], then the pixels belonging to that range will be quantized more precisely, but the strong unacceptable saturation of bright pixels will occur: clipping function (during quantization) will cut the data without opportunity to recover the lost information. Quantization of inputs to inner layers of a machine learning model may face the same problem, especially the machine learning model is used to deal with an image-to-image task. For that type of task, an input image is transferred through the model by skip connections. Consequently, the distribution of feature maps of such layers will be close to the input one.

The present application proposes to use transformations of input and output of machine learning models, which make better utilization of the whole data range (see right graph in FIG. 3). The proposed data transformations are tuned automatically during the training stage and/or the inference stage of quantized models, which makes it possible to obtain and use optimal data transformations for each quantization task. Moreover, the proposed data transformations allow for efficient implementation. Thus, the proposed technique makes it possible to increase the quality of quantized models in computer vision tasks in which the data is unevenly distributed, and at the same time the inference time of quantized models practically does not change.

The proposed data transformation method may be compatible with any quantization techniques and any training method, and the proposed data transformation method does not depend on the machine learning model and quantization format and does not require model changes. The proposed data transformation method allows for effective implementations. The proposed data transformation of inputs and outputs will practically not change the inference time of the quantized model. Further, the proposed data transformation method demonstrates a serious impact in quantization tasks. This technique can significantly increase the quality of quantized models in the tasks of quantization of models whose bitwidth is less than the bitwidth of the input data, for example, in the tasks of 8-bit full-int quantization of models that process 12-bit raw data. The proposed technique makes the use of effective low-bit full-int quantization more accessible.

The forward transformation (that is the nonlinear transformation performed by the nonlinear transformation subunit 221) makes the distribution of inputs of the first and other model layers closer to the uniform distribution, and as a result, the inputs to model layers become much easier to quantize using the uniform quantization. The reverse transformation (that is the reverse nonlinear transformation performed by the reverse nonlinear transformation subunit 223) returns back to the desired space of the model output.

As described above, the key to the present application is how the nonlinear transformation subunit 221 and the reverse nonlinear transformation subunit 223 work. The nonlinear transformation and the reverse nonlinear transformation are described in more detail below.

In some embodiments, the nonlinear transformation subunit 221 may perform a polynomial transformation on the values of the N pixels of the input image. In another word, the nonlinear transformation performed by the nonlinear transformation subunit 221 is the polynomial transformation.

Formula 1 shows a normal form of the polynomial transformation.

$$P(x) = a_0 + a_1 x + a_2 x^2 + \ldots + a_k x^k \quad \text{(formula 1)}$$

where $a_0, a_1, a_2, \ldots, a_k$ are parameters of the polynomial transformation, k is a bounded degree of the polynomial transformation, and k is a positive integer.

Corresponding to the present application, the nonlinear transformation subunit 221 may use formula 2 to obtain the $n^{th}$ first pixel value among the N first pixel values:

$$P(x_n) = a_0 + a_1 x_n + a_2 x_n^2 + \ldots + a_k x_n^k \quad \text{(formula 2)}$$

where $x_n$ is the value of the $n^{th}$ pixel among the N pixels, $P(x_n)$ is the $n^{th}$ first pixel value among the N first pixel values, $a_0, a_1, a_2, \ldots, a_k$ are parameters of the polynomial transformation, and k is a bounded degree of the polynomial transformation.

The bounded degree of the polynomial transformation (that is k in the formula 1 and 2) is related to calculation time of the polynomial transformation and quality of the result of the computer vision task for the input image. In general, if a value of the bounded degree is larger, the quality of the result would be better, but the calculation time would be longer; if the value of the bounded degree is smaller, the calculation time would be decreased, but the quality of the result would be worse. Thus, the value of the bounded degree may be selected based on a good balance between the calculation time of the polynomial transformation and the quality of the result, i.e., the value of the bounded degree may be less than 5 (that is, k<5).

In some embodiments, there is an efficient implementation of the polynomial transformation that use fused multiply-add (FMA) operations. An FMA operation has the form d=a+b×c. Therefore, the electronic device may calculation values of the polynomial according to the Horner's method. According to the Horner's method, formula 1 may be represented in:

$$P(x) = a_0 + a_1x + a_2x^2 + \ldots + a_kx^k = a_0 + x(a_1 + x(a_2 + \ldots + x(a_{k-1} + a_kx) \ldots )) \quad \text{(formula 3)}$$

In some embodiments, the nonlinear transformation subunit 221 may perform a gamma correction on the values of the N pixels of the input image. In another word, the nonlinear transformation performed by the nonlinear transformation subunit 221 is the gamma correction.

Formula 4 shows a normal form of the gamma correction.

$$\text{Gamma }(x) = \sqrt[p]{a \times x + b} \quad \text{(formula 4)}$$

where p, a, and b are parameters of the gamma correction.

Corresponding to the present application, the nonlinear transformation subunit 221 may use formula 5 to obtain the $n^{th}$ first pixel value among the N first pixel values:

$$\text{Gamma }(x_n) = \sqrt[p]{a \times x_n + b} \quad \text{(formula 5)}$$

where $x_n$ is the value of the $n^{th}$ pixel among the N pixels, Gamma ($x_n$) is the $n^{th}$ first pixel value among the N first pixel values, p, a, and b are parameters of the gamma correction.

In some embodiments, the nonlinear transformation subunit 221 may perform the nonlinear transformation by looking up a first transformation table, on the values of the N pixels to obtain the N first pixel values. Table 1 is an example of the first transformation table.

TABLE 1

| Values of the Pixels | Nonlinear Transformation Results |
|---|---|
| 0. | 0. |
| 0.01 | 0.1 |
| 0.1 | 0.32 |
| 0.25 | 0.5 |
| 0.9 | 0.95 |

The nonlinear transformation subunit 221 may find results of the nonlinear transformation according to table 1. For example, according to table 1, if a value of a pixel is 0.25, than a nonlinear transformation result of the pixel is 0.5.

The first transformation table may be determined according to an arithmetic transformation, e.g., the polynomial transformation, the gamma correction, or the like.

The reverse nonlinear transformation subunit 223 performs a reverse nonlinear transformation corresponding to the nonlinear transformation performed by the nonlinear transformation subunit 221.

In some embodiments, the reverse nonlinear transformation performed by the reverse nonlinear transformation subunit 223 may be an exact reverse transformation of the corresponding nonlinear transformation. The exact reverse transformation means that all parameters used in the reverse nonlinear transformation are the same as the parameters used in the corresponding nonlinear transformation. Take a Gamma-Digamma correction as an example, the nonlinear transformation subunit 221 uses the following formula to perform the gamma correction:

$$\text{Gamma }(x) = \sqrt[p_1]{a_1 \times x + b_1} \quad \text{(formula 6)}$$

where $p_1$, $a_1$, and $b_1$ are parameters of the gamma correction. The reverse nonlinear transformation subunit 223 may use the following formula to perform the degamma correction:

$$\text{Degamma }(x) = (x^{p_2} - b_2)/a_2 \quad \text{(formula 7)}$$

where $p_2$, $a_2$, and $b_2$ are parameters of the degamma correction. If the reverse nonlinear transformation is the exact reverse transformation, then $p_1=p_2$, $a_1=a_2$, and $b_1=b_2$.

In some embodiments, the reverse nonlinear transformation may be an inexact reverse transformation of the corresponding nonlinear transformation. The inexact reverse transformation means that a method used for the reverse nonlinear transformation corresponds to a method used for the nonlinear transformation, but the parameters of the reverse nonlinear transformation may be different from the parameters of the nonlinear transformation. For example, if the nonlinear transformation subunit 221 performs the gamma correction, the reverse nonlinear transformation subunit 223 will perform the degamma correction, but the parameters for the degamma correction may be different from the parameters for the gamma correction. Take the formula 6 and formula 7 as an example, if the reverse nonlinear transformation is the inexact reverse transformation, then $p_1 \neq p_2$, $a_1 \neq a_2$, or $b_1 \neq b_2$. For the polynomial transformation, the bounded degree of the nonlinear transformation may be different from that of the reverse nonlinear transformation. For example, the bounded degree of the nonlinear transformation may be 4 whereas the bounded degree of the reverse transformation corresponding to the nonlinear transformation may be 3.

In some embodiments, the reverse transformation can be not only exact and inexact reverse to the nonlinear transformation, but also absolutely independent with the nonlinear transformation. This means that the reverse transformation can not only have its own independent parameters from the nonlinear transformation, but can also have an absolutely independent format. For example, the forward transformation can be given by a lookup table, while the reverse transformation can be given by a polynomial. Any combination options are possible.

It may be understood that the above-mentioned nonlinear transformation methods are only examples of the nonlinear transformation rather than limitation. The nonlinear transformation may have other forms. For example, the nonlinear transformation subunit nonlinear t 221 may use an AI model to transform the values of the pixels of the input image.

In some embodiments, the parameters of the nonlinear transformation (i.e., $a_0$-$a_k$ in formula 1; and p, a, and b in formula 4) may be obtained by training. For example, the parameters of the nonlinear transformation may be trained with the quantized model at the same time. In another word, a training system may train the nonlinear transformation and the quantized model on training inputs from a training data repository to determine the parameters of the nonlinear transformation and the parameters of the quantized model. Therefore, at the training stage of the quantized model, the parameters of the nonlinear transformation are variable. The nonlinear transformation at the training stage may be regarded as a trainable data transformation. This makes it possible to improve the final quality of the quantized model. Once the training is complete, the parameters of the nonlinear transformation is fixed, and the nonlinear transformation with fixed parameters may be regarded as a fixed data transformation. At the inference stage, the fixed data transformation may be used to obtain the inputs of the quantized model. Correspondingly, the parameters of the reverse transformation corresponding to the nonlinear transformation may be trained together with the parameters of the nonlinear transformation and the quantized model.

In an embodiment, all of the parameters of the nonlinear transformation may be obtained by training. In another embodiment, part of the parameters of the nonlinear transformation are obtained by training. For example, the power of the nonlinear transformation (i.e., the parameter p in formula 4) may be obtained by training, and other parameters of the nonlinear transformation may be preset numbers.

An example of a computer vision problem is the Raw Joint Denoising-Demosaicking (JDD) task. For the Raw JDD task, the input data have a non-uniform distribution and are difficult to quantize (even to 8 bit). In the case of Raw JDD, light enough values could be quantized with less precision because noise and color change in light areas are not visible to the human eye, while values around zero (darker areas) could be quantized with higher precision because the noise from quantization in the dark areas is much more noticeable.

In general case, the proposed nonlinear transformations can be any, and their polynomial approximations can be used for efficiency at the inference stage. In the case of quantization of Raw JDD models, the nonlinear transformations are performed on the inputs of the quantized model, which make the input distribution wider around zero. The square root calculations (SQRT)-like functions (that is the Gamma-Degamma correction) help to quantize dark areas more precisely than light areas. As a result, in the following experiments the baseline full 8-bit quantization and quantization using non-trainable square root NDTQ, as well as quantization using polynomial trainable NDTQ that approximates SQRT-like functions are compared. In order to get the maximum effect from NDTQ, it is sufficient to use $4^{th}$ degree polynomials for the forward transformation and $3^{rd}$ degree polynomials for the reverse transformation. Further, keeping the bias parameters at zero in the forward and reverse NDTQ formulas leads to an increase in quality.

The operation of the proposed NDTQ pipeline (that is the pipeline shown in FIG. 2) using the example of two Raw JDD models: AIRAW1 and AIRAW2 models. In these experiments, full 8-bit quantization of these models in the SNPE format is performed.

Quantized models are trained by using straight-through estimators and smooth regularization of weights and activations for quantization. However, one can use any other approach to quantization-aware training. The training method should be chosen depending on the task, and the proposed technique is compatible with any training method. To evaluate the contribution of the proposed technique, the same training protocol is used to train all quantized models.

At the beginning of training of the baseline quantized model, the baseline quantized model is initialized with a pre-trained full precision model without NDTQ, and at the beginning of training of the quantized model with NDTQ, the quantized model is initialized with a pre-trained full precision model with fixed (square root) non-trainable NDTQ. The pre-trained full precision models are trained for the same amount of time and with the same training configurations, and have the same quality.

As a quality metric, PSNR of quantized models relative to the original full precision model on RGB images from the test datasets is measured. Also, examples of output images of quantized models are demonstrated.

The conducted experiments demonstrate that the proposed NDTQ technique improves the quality of Raw JDD full 8 bit quantized models AIRAW1 model consists of 24 convolutions. Using the example of this model, the results of the baseline full 8-bit quantization with full 8-bit quantization with non-trainable square root NDTQ, as well as with trainable polynomial NDTQ are compared.

It is observed that using NDTQ improves the quality of the full 8-bit quantized model, in particular, the noise level is reduced, and the details and color are improved.

The PSNRs corresponding to different full 8-bit quantized models are shown in the table 2.

TABLE 2

| Baseline full 8-bit | Full 8-bit with non-trainable square root NDTQ | Full 8-bit with polynomial trainable NDTQ |
|---|---|---|
| 34.43 dB | 35.25 dB | 37.01 dB |

AIRAW2 model consists of 30 convolutions. This model solves a more complex JDD task than the AIRAW1 model. The result of the baseline full 8-bit quantization is compared with that of the full 8-bit quantization with polynomial trainable NDTQ.

The perceptual quality of the quantized model with NDTQ exceeds the perceptual quality of the baseline quantized model, in particular, the noise level is reduced, the details and color are improved. PSNRs corresponding to different full 8-bit quantized models are shown in the table 3.

TABLE 3

| Evaluation Dataset | Baseline full 8-bit | Full 8-bit with polynomial trainable NDTQ |
|---|---|---|
| Dataset #1 ("Amber") | 27.60 B | 38.77 dB |
| Dataset #2("Jade") | 27.51 dB | 37.85 dB |

Figure 4:
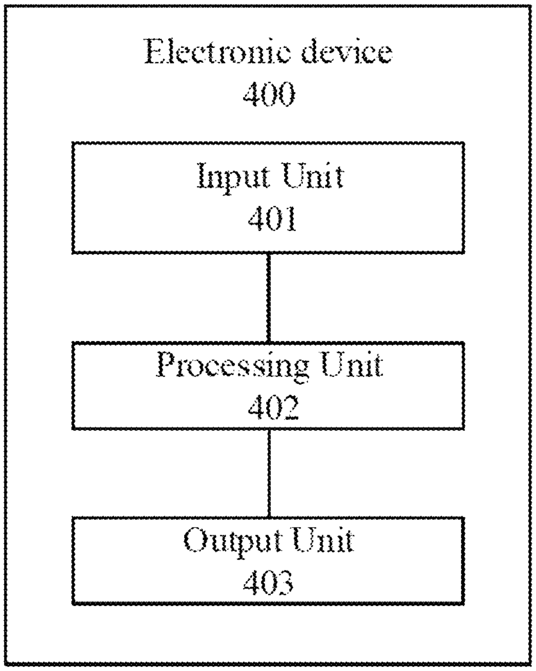
FIG. 4 is a schematic block diagram of an electronic device according to an embodiment of this application.

FIG. 4 is a schematic block diagram of an electronic device 400 according to an embodiment of this application. As shown in FIG. 4, the computing device 400 includes: an input unit 401, a processing unit 402, and an output unit 403.

The input unit 401 is configured to obtain an input image, wherein the input image includes N pixels, N is a positive integer.

The processing unit 402 is configured to perform a nonlinear transformation on values of the N pixels to obtain N first pixel values;

The processing unit 402 is further configured to obtain, according to a quantized model and the N first pixel values, M second pixel values, wherein M is a positive integer;

The processing unit 402 is further configured to perform a reverse transformation corresponding to the nonlinear transformation on the M second pixel values to obtain M third pixel values;

The output unit 403 is configured to determine, according to the M third pixels values, an output image.

It should be understood that the electronic device 400 in this embodiment of this application may correspond to the electronic device in the above-mentioned embodiments, and the foregoing and other management operations and/or functions of the units in the electronic device are separately used to implement corresponding steps of the foregoing methods. For brevity, details are not described herein again.

Figure 5:
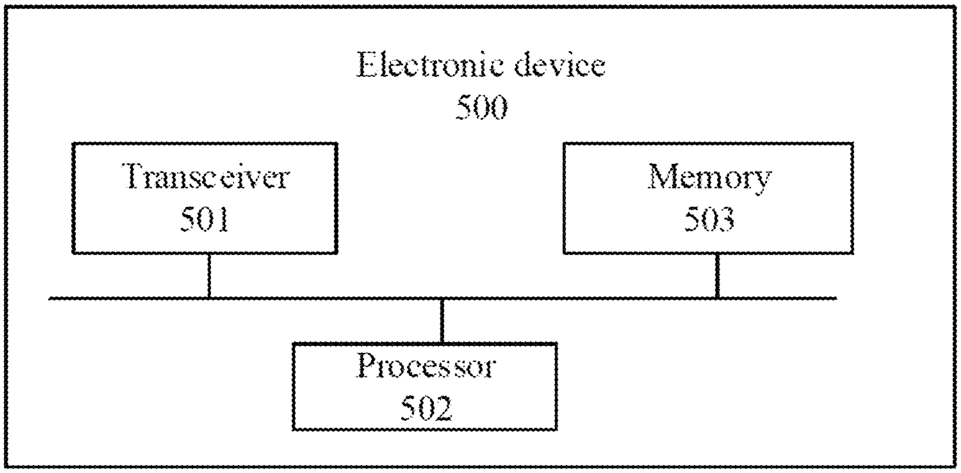
FIG. 5 is a schematic block diagram of an electronic device according to an embodiment of this application.

As shown in FIG. 5, an electronic device 500 may include a transceiver 501, a processor 502, and a memory 503. The memory 503 may be configured to store code, instructions, and the like executed by the processor 502.

It should be understood that the processor 502 may be an integrated circuit chip and has a signal processing capability. In an implementation process, steps of the foregoing method embodiments may be completed by using a hardware integrated logic circuit in the processor, or by using instructions in a form of software. The processor may be a general purpose processor, a central processing unit (CPU), a graphics processing unit (GPU), a neural processing unit (NPU), a system on chip (SoC) or another programmable logic device, a discrete gate or transistor logic device, or a discrete hardware component. The processor may implement or perform the methods, the steps, and the logical block diagrams that are disclosed in the embodiments of the present invention. The general purpose processor may be a microprocessor, or the processor may be any conventional processor or the like. The steps of the methods disclosed with reference to the embodiments of the present invention may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 503 in the embodiments of the present invention may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. By way of example rather than limitation, many forms of RAMs may be used, and are, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous link DRAM, SLDRAM), and a direct rambus random access memory (Direct Rambus RAM, DR RAM).

It should be noted that the memory in the systems and the methods described in this specification includes but is not limited to these memories and a memory of any other appropriate type.

Figure 6:
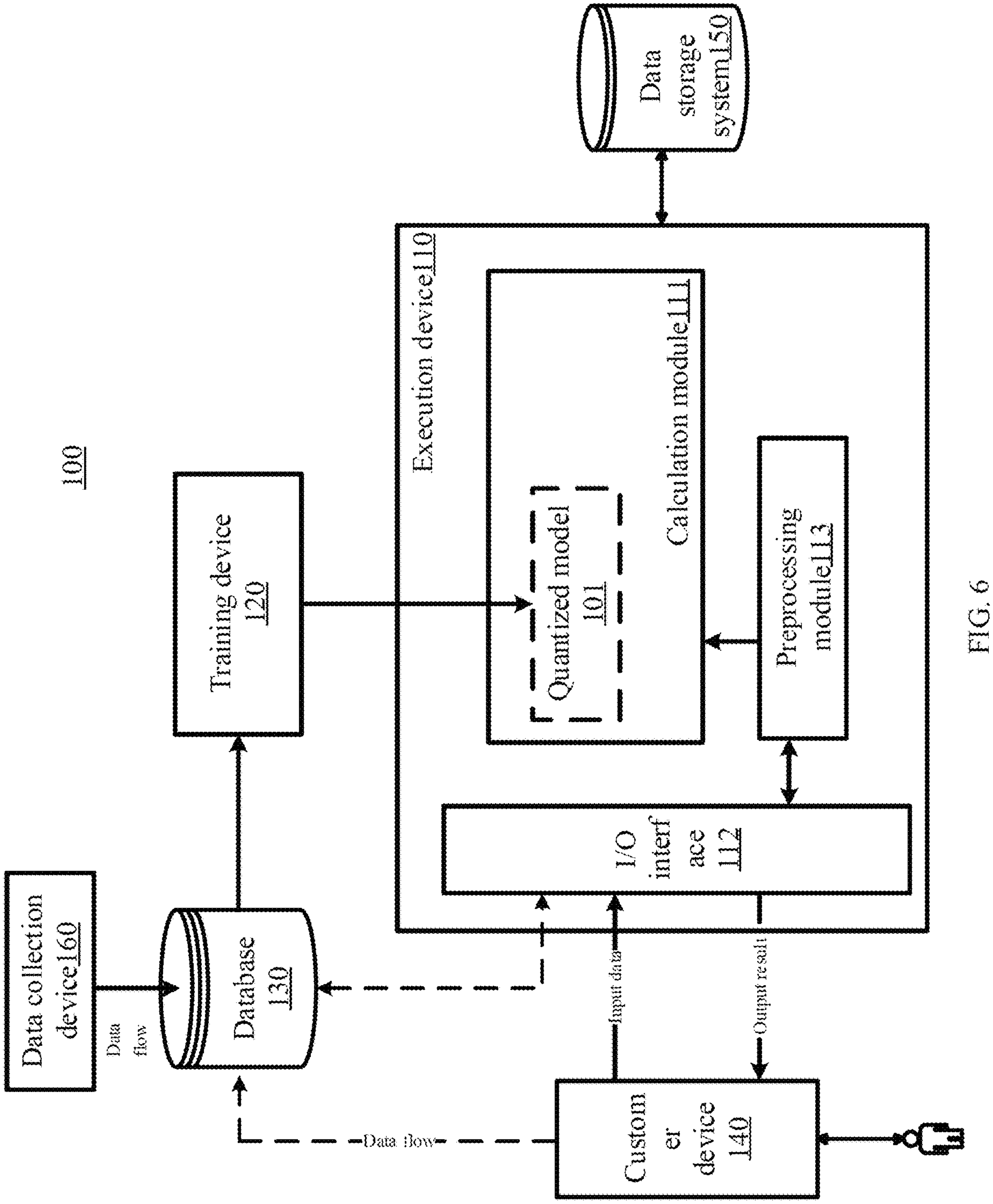
FIG. 6 is a schematic diagram of a system architecture according to an embodiment of this application.

Referring to FIG. 6, an embodiment of the present application provides a system architecture 600. As shown in the system architecture 600, a data collection device 660 is configured to collect training data. In this embodiment of this application, the training data includes one or more images (namely, training samples) and real results corresponding to the one or more images. The training data may be stored into a database 630. A training device 620 may obtain a quantized model 601, parameters of the nonlinear transformation and the parameters of the reverse nonlinear transformation through training based on training data maintained in the database 630. Details about the training procedure may be referred to the forgoing embodiments and are not described herein again. It should be noted that, in actual application, the training data maintained in the database 630 is not necessarily all collected by the data collection device 660, and may be received from another device. In addition, it should be noted that the training device 620 does not necessarily perform training completely based on the training data maintained in the database 630 to obtain the target model/rule 601, and may obtain training data from a cloud or another place to perform model training. The foregoing description shall not be construed as a limitation on this embodiment of this application.

The target model/rule 601 obtained by the training device 620 through training may be applied to different systems or devices, for example, applied to an execution device 610 shown in FIG. 6. The execution device 610 may be a terminal, such as a mobile phone terminal, a tablet computer, a notebook computer, an augmented reality (AR) device, a virtual reality (VR) device, or a vehicle-mounted terminal, or may be a server or the like. In FIG. 6, an I/O interface 612 is configured on the execution device 610 and is configured to exchange data with an external device. A user may input data into the I/O interface 612 by using a customer device 640. In this embodiment of this application, the input data may include an input image. The input image may be an image collected by the execution device 610 by using the data collection device 660, may be an image in the database 630, or may be an image from the customer device 640.

A preprocessing module 613 is configured to perform preprocessing based on the input data (for example, the input image) received by the I/O interface 612. In this embodiment of this application, the preprocessing module 613 may be configured to implement one or more of the following operations: the nonlinear transformation, the reverse nonlinear transformation, and the like; and is further configured to implement another preprocessing operation.

In a related processing procedure in which the execution device 610 preprocesses the input data or a calculation module 611 of the execution device 610 performs calculation, the execution device 610 may invoke data, code, and the like in a data storage system 650 to implement corresponding processing, and may also store, into the data storage system 650, data, an instruction, and the like obtained through corresponding processing.

Finally, the I/O interface 612 returns a processing result, for example, the foregoing obtained image processing result, to the customer device 640, to provide the processing result for the user.

It should be noted that the training device 620 may obtain, through training based on different training data, corresponding quantized models 601 for different targets that are alternatively referred to as different tasks. The corresponding quantized models 601 may be used to implement the foregoing targets or complete the foregoing tasks, to provide a required result for the user.

In a case shown in FIG. 6, the user may manually provide the input data. The manually providing may be performed by using a screen provided on the I/O interface 612. In another case, the customer device 640 may automatically send the input data to the I/O interface 612. If it is required that the customer device 640 need to obtain authorization from the user to automatically send the input data, the user may set corresponding permission on the customer device 640. The user may view, on the customer device 640, a result output by the execution device 610. Specifically, the result may be displayed or may be presented in a form of sound, an action, or the like. The customer device 640 may also be used as a data collection end to collect the input data that is input into the I/O interface 612 and an output result that is output from the I/O interface 612, as shown in the figure, use the input data and the output result as new sample data, and store the new sample data into the database 630. Certainly, alternatively, the customer device 640 may not perform collection, and the I/O interface 612 directly stores, into the database 630 as new sample data, the input data that is input into the I/O interface 612 and an output result that is output from the I/O interface 612, as shown in the figure.

It should be noted that FIG. 6 is merely a schematic diagram of a system architecture provided in an embodiment of the present application. A location relationship between a device, a component, a module, and the like shown in the figure constitutes no limitation. For example, in FIG. 6, the data storage system 650 is an external memory relative to the execution device 610. In another case, the data storage system 650 may be alternatively disposed in the execution device 610.

An embodiment of this application further provides a system chip, where the system chip includes an input/output interface, at least one processor, at least one memory, and a bus. The at least one memory is configured to store instructions, and the at least one processor is configured to invoke the instructions of the at least one memory to perform operations in the methods in the foregoing embodiments.

An embodiment of this application further provides a computer storage medium, where the computer storage medium may store a program instruction for performing any of the foregoing methods.

Optionally, the storage medium may be specifically the memory 503.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transforming data for artificial intelligence (AI) inference, comprising:

obtaining an input image, wherein the input image comprises N pixels represented by a first bitwidth, N is a positive integer;

performing a nonlinear transformation on values of the N pixels to obtain N first pixel values, wherein the nonlinear transformation is configured to make a distribution of the N first pixel values closer to a uniform distribution than a distribution of the N pixels;

obtaining, according to a quantized model and the N first pixel values, M second pixel values, wherein M is a positive integer and a second bitwidth of the quantized model is less than the first bitwidth of the input image;

performing a reverse transformation corresponding to the nonlinear transformation on the M second pixel values to obtain M third pixel values;

determining, according to the M third pixels values, an output image, wherein parameters of the nonlinear transformation and parameters of the quantized model are obtained by training together using common training data.

2. The method according to claim 1, wherein the performing a nonlinear transformation on values of the N pixels to obtain N first pixel values, comprises:

performing a polynomial transformation on the values of the N pixels to obtain the N first pixel values.

3. The method according to claim 2, wherein a bounded degree of the polynomial transformation is less than 5.

4. The method according to claim 1, wherein the performing a nonlinear transformation on values of the N pixels to obtain N first pixel values, comprises:

performing a gamma correction on the values of the N pixels to obtain the N first pixel values.

5. The method according to claim 1, wherein the performing a nonlinear transformation on values of the N pixels to obtain N first pixel values, comprises:

performing the nonlinear transformation, by looking up a first transformation table, on the values of the N pixels to obtain the N first pixel values.

6. The method according to claim 1, wherein the second bitwidth of the quantized model is 8 bits and the first bitwidth of the input image is greater then 8 bits.

7. An apparatus, wherein the apparatus comprises:

a processor, and a memory coupled to the processor and configured to store a plurality of instructions that, when executed by the processor, causes the processor to perform operations comprising:

obtaining an input image, wherein the input image comprises N pixels represented by a first bitwidth, N is a positive integer;

performing a nonlinear transformation on values of the N pixels to obtain N first pixel values, wherein the nonlinear transformation is configured to make a distribution of the N first pixel values closer to a uniform distribution than a distribution of the N pixels;

obtaining, according to a quantized model and the N first pixel values, M second pixel values, wherein M is a positive integer and a second bitwidth of the quantized model is less than the first bitwidth of the input image;

performing a reverse transformation corresponding to the nonlinear transformation on the M second pixel values to obtain M third pixel values; and determining, according to the M third pixels values, an output image, wherein parameters of the nonlinear transformation and parameters of the quantized model are obtained by training together using common training data.

8. The apparatus according to claim 7, wherein the performing a nonlinear transformation on values of the N pixels to obtain N first pixel values, further causes the processor to:

perform a polynomial transformation on the values of the N pixels to obtain the N first pixel values.

9. The apparatus according to claim 8, wherein a bounded degree of the polynomial transformation is less than 5.

10. The apparatus according to claim 7, wherein the performing a nonlinear transformation on values of the N pixels to obtain N first pixel values, further causes the processor to:

perform a gamma correction on the values of the N pixels to obtain the N first pixel values.

11. The apparatus according to claim 7, wherein the performing a nonlinear transformation on values of the N pixels to obtain N first pixel values, further causes the processor to:

perform the nonlinear transformation, by looking up a first transformation table, on the values of the N pixels to obtain the N first pixel values.

12. A non-transitory computer-readable storage medium, wherein the non-transitory computer-readable storage medium stores computer-executable instructions, and when the computer-executable instructions are executed by one or more processors of an apparatus, cause the apparatus to transform data for artificial intelligence (AI) inference by performing operations comprising:

obtain an input image, wherein the input image comprises N pixels represented by a first bitwidth, N is a positive integer;

perform a nonlinear transformation on values of the N pixels to obtain N first pixel values, wherein the nonlinear transformation is configured to make a distribution of the N first pixel values closer to a uniform distribution than a distribution of the N pixels;

obtain, according to a quantized model and the N first pixel values, M second pixel values, wherein M is a positive integer and a second bitwidth of the quantized model is less than the first bitwidth of the input image;

perform a reverse transformation corresponding to the nonlinear transformation on the M second pixel values to obtain M third pixel values;

determine, according to the M third pixels values, an output image, wherein parameters of the nonlinear transformation and parameters of the quantized model are obtained by training together using common training data.

13. The non-transitory computer-readable storage medium according to claim 12, wherein the performing a nonlinear transformation on values of the N pixels to obtain N first pixel values, further cause the apparatus to:

perform a polynomial transformation on the values of the N pixels to obtain the N first pixel values.

14. The non-transitory computer-readable storage medium according to claim 13, wherein a bounded degree of the polynomial transformation is less than 5.

15. The non-transitory computer-readable storage medium according to claim 12, wherein the performing a nonlinear transformation on values of the N pixels to obtain N first pixel values, further cause the apparatus to:

perform a gamma correction on the values of the N pixels to obtain the N first pixel values.

16. The non-transitory computer-readable storage medium according to claim 12, wherein the performing a nonlinear transformation on values of the N pixels to obtain N first pixel values, further cause the apparatus to:

perform the nonlinear transformation, by looking up a first transformation table, on the values of the N pixels to obtain the N first pixel values.

17. The non-transitory computer-readable storage medium according to claim 12, wherein the second bitwidth of the quantized model is 8 bits and the first bitwidth of the input image is greater than 8 bits.

* * * * *